US 9,163,753 B2

(12) United States Patent
Hartin (10) Patent No.: US 9,163,753 B2
(45) Date of Patent: Oct. 20, 2015

(54) SELF-ALIGNING PRODUCT DELIVERY SYSTEM

(75) Inventor: Ryan P. Hartin, New Brighton, MN (US)

(73) Assignee: Determan Brownie, Inc., Minneapolis, MN (US)

( * ) Notice: Subject to any disclaimer, the term of this patent is extended or adjusted under 35 U.S.C. 154(b) by 721 days.

(21) Appl. No.: 13/548,860

(22) Filed: Jul. 13, 2012

(65) Prior Publication Data

US 2014/0014196 A1    Jan. 16, 2014

(51) Int. Cl.

| | |
|---|---|
| *B67C 3/26* | (2006.01) |
| *F16L 9/00* | (2006.01) |
| *B60K 15/04* | (2006.01) |
| *B67D 1/00* | (2006.01) |

(52) U.S. Cl.
CPC . *F16L 9/00* (2013.01); *B60K 15/04* (2013.01); *B67D 1/00* (2013.01); *Y10T 137/3084* (2015.04)

(58) Field of Classification Search
CPC .......... B67D 7/421; B67D 7/54; B67D 7/002; B67D 7/02; Y10T 137/8807
USPC ...................... 141/95, 59, 198, 263, 279, 387
See application file for complete search history.

(56) References Cited

U.S. PATENT DOCUMENTS 3,964,512 A *   6/1976   Dumas ........................ 137/615

OTHER PUBLICATIONS

Hatch Cover Vapor Plates—OPW Engineered Systems, [online], [retrieved Dec. 19, 2011], Website address unknown, 1 page.
Hatch Cover Vapor Plates—OPW Engineered Systems, [online], [retrieved Sep. 28, 2012], <http://www2.opwftg.com/www/en/opwftg/products/chemicalindustrial/loadingrackequipment/toploadingvaporrecovery/vaporrecoverycomponents/vapor-plates.jsp>, 1 page.
Inflatable Hatch Seal—OPW Engineered Systems, [online], [retrieved Dec. 19, 2011], Website address unknown, 2 pages.
Inflatable Hatch Seal—OPW Engineered Systems, [online], [retrieved Sep. 28, 2012], <http://66.111.96.16/www/opwftg/products/chemicalindustrial/loadingrackequipment/toploadingvaporrecovery/vaporrecoverycomponents/inflatable-hatch-seal.jsp>, 2 pages.
Tapered Plug Hatch Seal—OPW Engineered Systems, [online], [retrieved Dec. 19, 2011], Website address unknown, 1 page.
Tapered Plug Hatch Seal—OPW Engineered Systems, [online], [retrieved Sep. 28, 2012], <http://www.opwftgindia.com/www/en/india/products/chemicalindustrial/loadingrackequipment/toploadingvaporrecovery/vaporrecoverycomponents/tapered-plug.jsp>, 1 page.
Emco Wheaton, A Gardner Denver Product, Loading Arm E2630 With Vapour Return Hose, [online], [Jul. 2006] <http://www.emcowheaton.com/searchresults.aspx?searchText=e2630>, 2 pages.

* cited by examiner

*Primary Examiner* — Jason K Niesz
(74) *Attorney, Agent, or Firm* — IPLM Group, P.A.

(57) ABSTRACT

A self-aligning product delivery system including a vapor plate assembly and a ball joint assembly is provided. The vapor plate assembly has a vapor plate base portion with a vapor plate passage and a seating plate portion. The seating plate portion has a generally spherical segment shaped seating face defining an opening to the vapor plate passage. The ball joint assembly includes a ball joint base portion with a ball joint passage and an engaging portion. The engaging portion includes a generally spherical segment shaped joining surface. The spherical segment shaped joining surface of the engaging portion of the ball joint assembly is configured and arranged to rotationally mate with the spherical segment shaped seating face defining the opening of the vapor plate assembly to create a seal between the vapor plate assembly and the ball joint assembly.

20 Claims, 6 Drawing Sheets

SELF-ALIGNING PRODUCT DELIVERY SYSTEM

BACKGROUND

A sealed filling connection and proper ventilation for displaced vapors and dusts is required when filling tanks such as rail tank cars, vehicle tanks, stationary tanks and the like with product such as, but not limited to, flammable or combustible liquids or material, valuable dusts, powders and the like. When filling a tank from the top, a boom, such as a hydraulic boom, is commonly used to position the filling hose and connector in an opening in the tank. Problems can occur when the boom does not properly align the connector causing the seal to not properly seat. For example, this misalignment can cause an escape of damaging or valuable vapors, dusts or powders into the atmosphere as well as the spillage of product being pumped into the tank. Therefore, a significant amount of time and effort may be needed to ensure the connection is properly aligned.

For the reasons stated above and for other reasons stated below which will become apparent to those skilled in the art, upon reading and understanding the present specification, there is a need in the art for an effective and efficient connection and venting system that self aligns.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a self-aligning product delivery system is provided. The system includes a vapor plate assembly and a ball joint assembly. The vapor plate assembly includes a vapor plate base portion and a seating plate portion. The vapor plate base portion has a vapor plate passage. The seating plate portion has an opening to the vapor plate passage. The seating plate portion further has a generally spherical segment shaped seating face defining the opening to the central vapor plate passage. The ball joint assembly includes a ball joint base portion with a ball joint passage and an engaging portion. The engaging portion extends outward from a surface of the ball joint base portion. The engaging portion includes a generally spherical segment shaped joining surface. The spherical segment shaped joining surface of the engaging portion of the ball joint assembly is configured and arranged to rotationally mate with the spherical segment shaped seating face defining the opening of the vapor plate assembly to create a seal between the vapor plate assembly and the ball joint assembly while the central ball joint passage of the ball joint assembly is aligned with the vapor plate passage of the vapor plate assembly.

In another embodiment, another self-aligning product delivery system is provided. The system includes a vapor plate assembly, a ball joint assembly and an O-ring. The vapor plate assembly includes a vapor plate base portion with a vapor plate passage. The vapor plate base portion has an upper end and an opposed lower end. A sealing flange extends outward from the vapor plate base portion proximate the lower end of the vapor plate base portion. A seating plate portion extends inward from the vapor plate base portion proximate the upper end of the vapor plate base portion. The seating plate has an opening to the vapor plate passage. The seating plate further has a generally spherical segment shaped seating face positioned around the opening. The spherical segment shaped seating face of the vapor plate assembly has a groove. The ball joint assembly includes a ball joint base portion with a ball joint passage and an engaging portion. The engaging portion extends outward from a surface of the ball joint base portion. The engaging portion includes a generally spherical segment shaped joining surface. The spherical segment shaped joining surface of the engaging portion of the ball joint assembly is configured and arranged to rotationally mate with the spherical segment shaped seating face defining the central opening of the vapor plate assembly to create a seal between the vapor plate assembly and the ball joint assembly while the ball joint passage of the ball joint assembly is aligned with the vapor plate passage of the vapor plate assembly. The O-ring is received in the groove of the spherical segment shaped seating face to provide a seal between the spherical segment shaped seating face of the vapor plate assembly and the spherical segment shaped joining surface of the engaging portion of the ball joint assembly.

In yet another embodiment, still another self-aligning product delivery system is provided. The system includes a vapor plate assembly, a ball joint assembly, at least one removable retaining bracket and a vapor escape portion. The vapor plate assembly includes a vapor plate base portion with a vapor plate passage. The vapor plate base portion has an upper end and an opposed lower end. A sealing flange extends outward from the vapor plate base portion proximate the lower end of the vapor plate base portion. A seating plate portion extending inward from the vapor plate portion proximate the upper end of the vapor plate base portion. The seating plate has a central opening to the vapor plate passage. The seating plate further has a generally spherical segment shaped seating face positioned around the central opening. The ball joint assembly includes a ball joint base portion with a ball joint passage and an engaging portion. The engaging portion extends outward from a surface of the ball joint base portion. The engaging portion includes a generally spherical segment shaped joining surface. The spherical segment shaped joining surface of the engaging portion of the ball joint assembly is configured and arranged to rotationally mate with the spherical segment shaped seating face defining the central opening of the vapor plate assembly to create a seal between the vapor plate assembly and the ball joint assembly when the ball joint passage of the ball joint assembly is aligned with the vapor plate passage of the vapor plate assembly. The at least one removable retaining bracket is coupled to the vapor plate assembly. The at least one removable retaining bracket is configured and arranged to retain an alignment of the spherical segment shaped seating face of the vapor plate assembly with the spherical segment shaped joining surface of the engaging portion of the ball joint assembly. The vapor escape portion is coupled to the vapor plate base portion of the vapor plate assembly providing a vapor escape passage through the vapor plate base portion.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
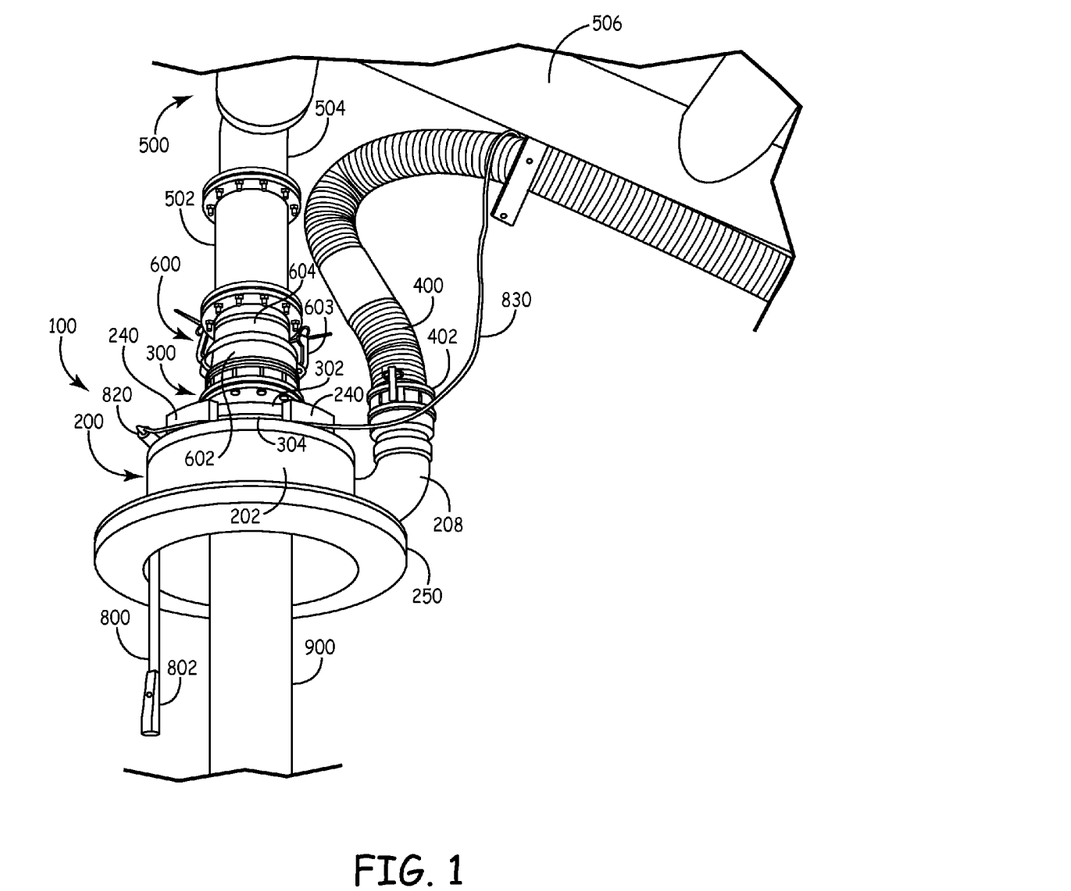
FIG. 1 is a side perspective view of a self-aligning liquid product delivery system coupled to a positioning boom of one embodiment of the present invention.

Embodiments of the present invention provide a self-aligning product delivery system 100 that efficiently and effectively provide a connection to fill a container such as, but not limited to, a rail tank car. In embodiments, the self-aligning product delivery system 100 is configured and arranged to self-align so that a boom assembly designed to fill a rail tank car does not have to be exactly aligned with an opening in the rail tank car to prevent the unintentional spilling of liquid product and the unintentional discharge of vapors into the atmosphere. Referring to FIG. 1, an illustration of an embodiment of the self-aligning product delivery system 100 coupled to a boom assembly 500 is illustrated. In particular, the boom assembly 500 is illustrated as including a boom arm 506 that contains a passage for liquid product. The boom arm 506 would be attached to an activation mechanism (not shown) that selectively moves the boom arm 506 to a desired position. Attached to the boom arm 506 is a swivel connector 504. The swivel connector 504 couples a boom extender 502 to the boom arm 506. The swivel connector 504 allows rotation in a vertical plane which allows a desired placement of the self-aligning product delivery system 100 as the boom arm 506 is lowered or raised. A boom connector 600 is used to connect the self-aligning product delivery system 100 to the boom assembly 500 via the boom extender 502. The boom connector 600 in this embodiment includes a lower cylindrical connecting member 602 and an upper cylindrical connecting member 604. As illustrated in FIG. 1 and in FIG. 2, an upper portion of the upper connecting member 604 is coupled to the boom extender 502 and a lower portion of the lower connecting member 602 is coupled to the ball joint assembly 300 of the self-aligning product delivery system 100. The lower connecting member 602 and the upper connecting member 604 are connected together via a quick release system that includes fasteners 603. Hence, the self-aligning product delivery system 100 can be coupled to the boom assembly 500 in a fast and efficient manner.

Figure 2:
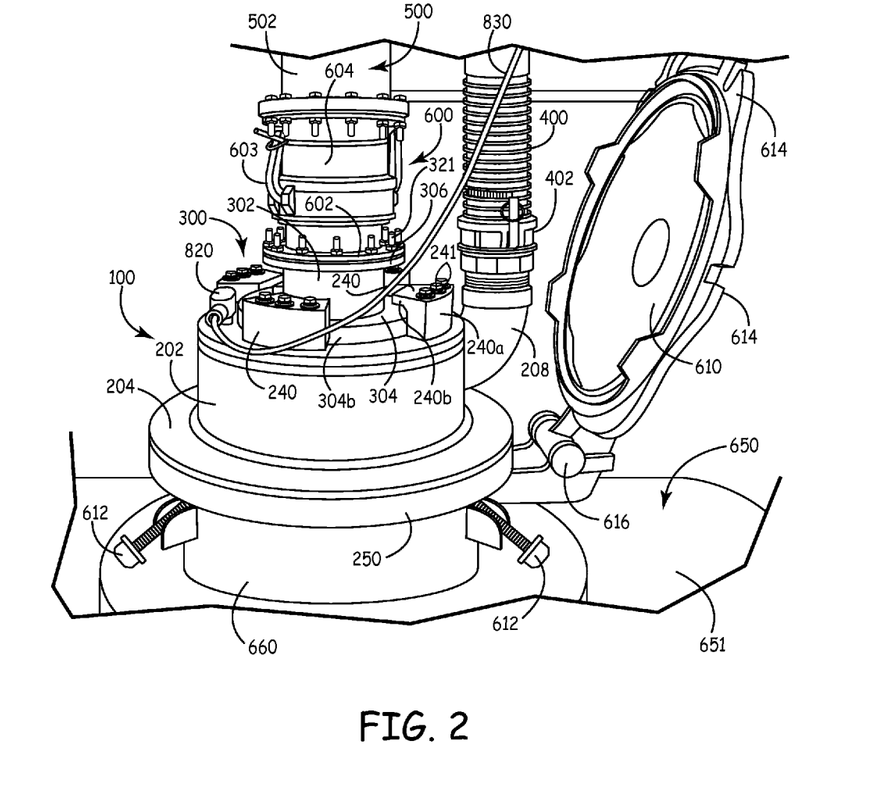
FIG. 2 is a side perspective view of the self-aligning liquid product delivery system of FIG. 1 positioned to deliver liquid product to a rail tank car.

As further illustrated in FIG. 1, a discharge tube 900 extends from the self-aligning product delivery system 100. Liquid product is passed through this discharge tube 900 in filling the rail tank car 650. FIG. 2 illustrates self-aligning product delivery system 100 coupled to a rail tank car 650. In particular, the rail tank car 650 is illustrated as including an upper shell 651 of a housing, a top fill cover 610 and an opening 652 (illustrated in FIG. 6). As illustrated in FIG. 2, the top fill cover 610 is pivotally coupled to a raised portion 660 of the rail tank 650 via pivot connection 616. The fill cover 610 further includes retaining lips 614 with slots that selectively receive fasteners 612 that retain the top fill cover 610 over the opening 652 when the rail tank car 650 is not being filled. Also illustrated in FIGS. 1 and 2 is a vapor conduit 400 that is designed to provide a discharge passage for vapors that are displaced when the rail tank car 650 is being filled with product. In embodiments, the vapors or dust are collected. Moreover, in some embodiments, gas vapors collected are either burned off or condensed to be reclaimed as a liquid. Also illustrated is a signal communication link 830. The signal communication link 830 provides a link between a high level sensor 800 and an alarm (not shown) that indicates when the train tank car is full. The high level sensor 800 is further discussed below.

Figure 3:
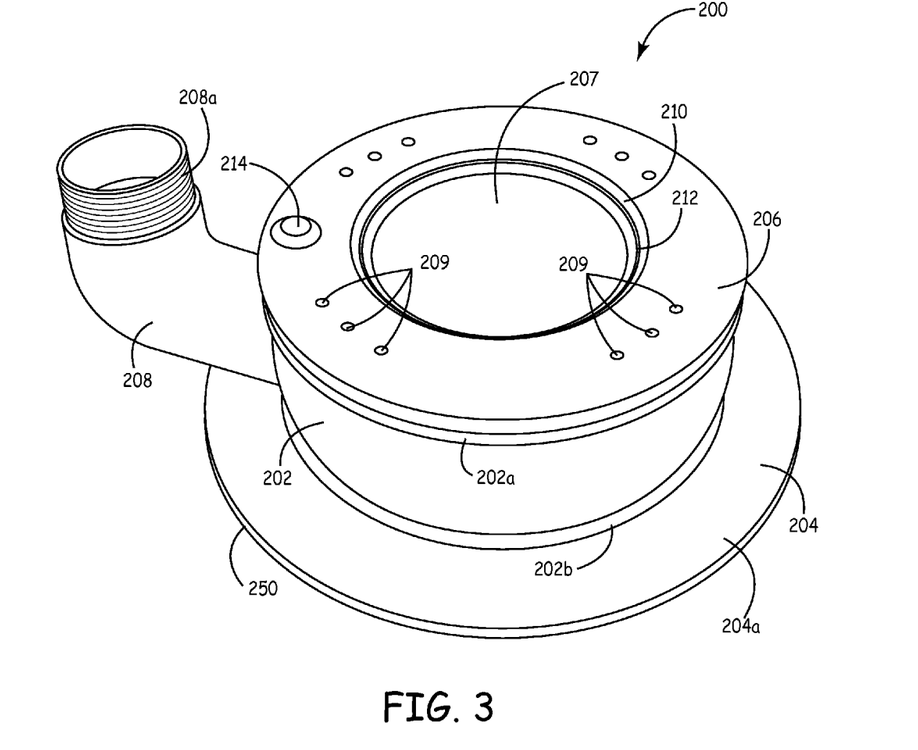
FIG. 3 is a side perspective view of a vapor plate assembly of one embodiment of the present invention.

The self-aligning product delivery system 100 includes a vapor plate assembly 200 and a ball joint assembly 300. An illustration of the vapor plate assembly 200 is illustrated in FIG. 3. As illustrated, the vapor plate assembly 200 includes a generally cylindrical vapor plate base portion 202. The vapor plate base portion 202 includes an upper end 202a and a lower end 202b. A sealing flange 204 extends outward from the vapor plate base portion 202 proximate the lower end 202b of the vapor plate base portion 202. Proximate the upper end 202a of the vapor plate base portion 202 a seating plate 206 extends inward. The seating plate 206 includes a central vapor plate passage 207 and a spherical segment shaped seating face 210 that defines an opening to the central passage 207. In an embodiment, the seating face 210 includes a groove 212 that is configured to receive an O-ring (shown in FIG. 6). The seating plate 206 further includes a plurality of threaded bores 209 and a high level sensor aperture 214 which are further discussed below. The vapor plate assembly 200 further includes a vapor escape portion 208. The vapor escape portion 208 is coupled to a portion of the vapor plate base portion 202. The vapor escape portion 208 includes a passage 202c (shown in FIG. 6) which passes through the vapor plate base portion 202. A connecting end 208a of the vapor escape portion 208 is designed to be coupled to the vapor conduit 400 via vapor connector 402 as illustrated in FIGS. 1 and 2. Moreover, a gasket 250 is configured to be coupled to a bottom surface 204b (shown in FIG. 6) of the sealing flange 204. Gasket 250 provides a seal between the self-aligning product delivery system 100 and the opening to the train tank car 650.

Figure 4:
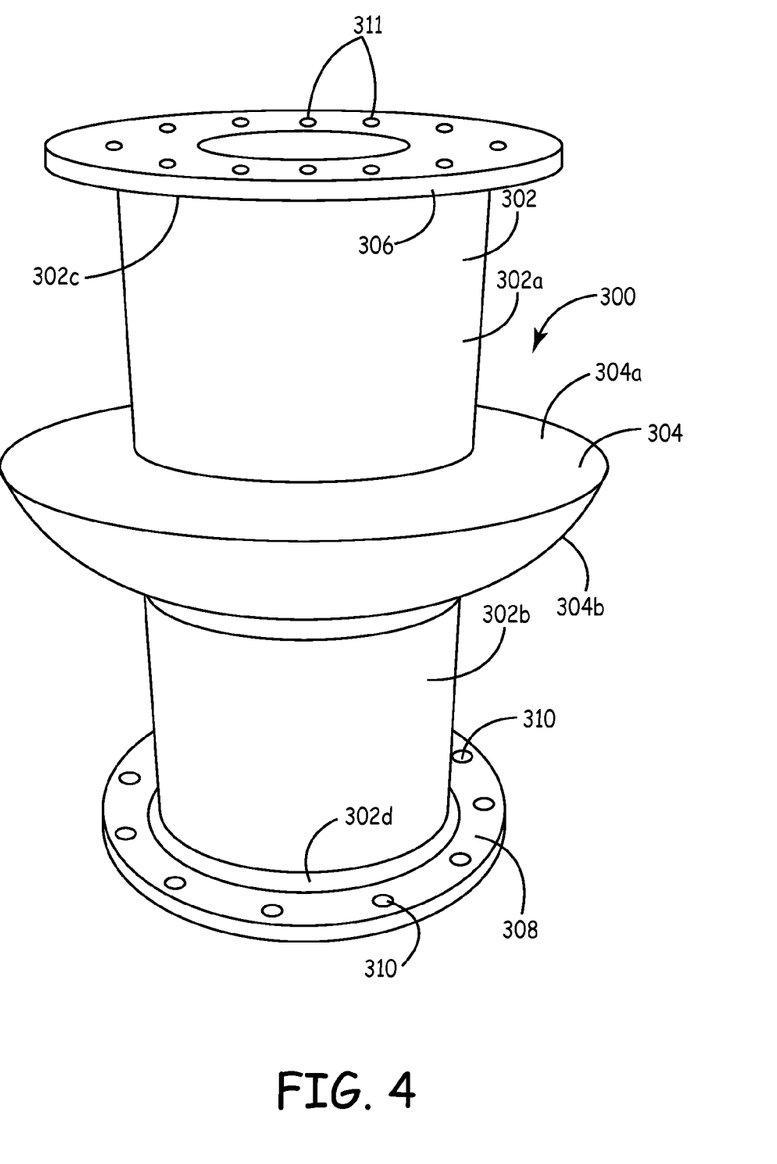
FIG. 4 is a side perspective view of a ball joint assembly of one embodiment of the present invention.

An illustration of the ball joint assembly 300 is illustrated in FIG. 4. The ball joint assembly 300 includes a ball joint base portion 302 that is generally cylindrical in shape and a engaging portion 304. As illustrated, the engaging portion 304, in this embodiment, extends from a surface of the ball joint base portion 302 about a mid portion of the ball joint base portion 302 separating an upper portion 302a of the ball joint base portion 302 from a lower portion 302b of the ball joint base portion 302. The engaging portion 304 includes a first surface 304a that generally extends outward from the surface of the ball joint base portion 302 in a generally perpendicular fashion. The engaging portion 304 further includes a spherical segment shaped joining surface 304b.

The spherical segment shaped joining surface 304b extends outward from the surface of the ball joint base portion 302 a select distance from which the first surface 304a of the engaging portion 304 is extended. The spherical segment shaped joining surface 304b terminates at an intersection of the surface 304b with the first surface 304a. The spherical segment shaped joining surface 304b of the engaging portion 304 is designed to rotationally mate with the spherical segment shaped seating face 210 of the vapor plate assembly 200 as further discussed below. The ball joint base portion 302 further includes an upper end 302c and a lower end 302d. An upper flange 306 extends outward from the upper end 302c of the ball joint base portion 302 and a lower flange 308 extends outward from the lower end 302d of the ball joint base portion 302. The lower flange 308 is used to couple the ball joint assembly 302 to the discharge tube 900 (shown in FIG. 1) via connecting apertures 310 and fasteners (not shown in FIG. 4). The upper flange 306 is used to couple the ball joint assembly 302 to the lower cylindrical connecting member 602 of the boom connector 600 as illustrated in FIGS. 1 and 2 via connection apertures 311 and fasteners 321.

Figure 5:
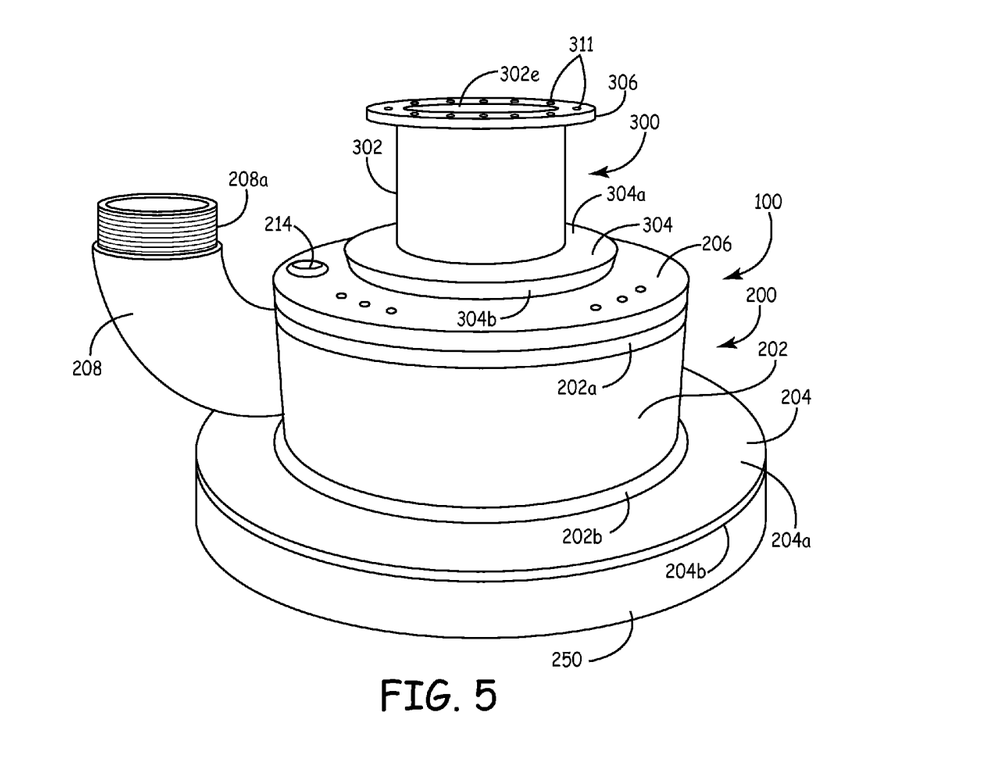
FIG. 5 is a side perspective view of the vapor plate assembly of FIG. 3, operationally connected to the ball joint assembly of FIG. 4.
Figure 6:
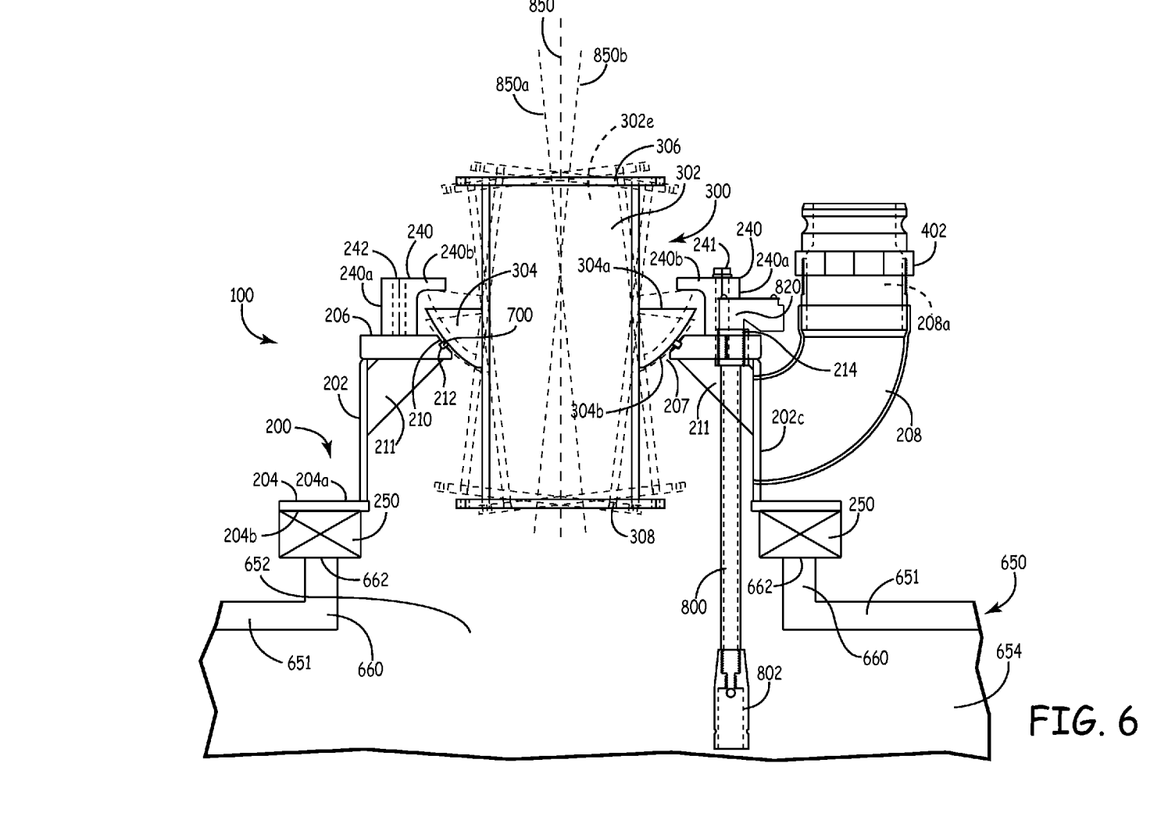
FIG. 6 is a cross-sectional view of the self-aligning liquid product delivery system positioned to deliver liquid to a rail tank car of one embodiment of the present invention.

An illustration of the engaging portion 304 of the ball joint assembly 300 seated in the opening of the seating plate 206 of the vapor plate assembly 200 is shown in FIG. 5. Referring to FIG. 6, a cross-sectional view of the self-aligning product delivery system 100 positioned to deliver fluid to the rail tank car 650 is illustrated. FIG. 6 further illustrates that the ball joint assembly 300 can have different orientations in relation to the vapor plate assembly 200 while maintaining a sealed product delivery system 100. In particular, the ball joint assembly 300 is illustrated as having a center of rotation 850. Center of rotation 850 is illustrated as being generally perpendicular to the seating plate 206 of the vapor plate assembly 200 while the center of rotation 850a and 850b deviate from this ideal configuration. Illustrated axes 850a and 850b represent the situation where the boom assembly 500 does not ideally align the product delivery system 100 to the opening 652 of the rail tank car 650. As illustrated, no matter the position of the ball joint assembly 300 in relation to the vapor plate assembly 200, the spherical segment shaped joining surface 304b of the engaging portion 304 remains mated with the spherical segment shaped seating face 210 of the seating plate 206 of the vapor plate assembly 200. The O-ring 700 received in the groove 212 in the spherical segment shaped seating face 210 maintains a seal between the spherical segment shaped seating face 210 of the vapor plate assembly 200 and the spherical segment shaped joining surface 304b of the ball joint assembly 300.

A plurality of retaining brackets 240 are used to retain the ball joint assembly 300 in position in relation to the vapor plate assembly 200. The plurality of retaining brackets 240 are coupled to the seating plate 206 around the central passage 207 of the vapor plate assembly 200. In particular, each retaining bracket 240 includes a plurality of bores 242 that are aligned with respective threaded retaining bracket bores 209 (shown in FIG. 3) in the seating plate 206 of the vapor plate assembly 200. Threaded fasteners 241 (bolts in this embodiment) are then passed through each of the bores 242 in the retaining brackets 240 and are threadably engaged to respective retaining bracket bores 209 therein coupling the retaining brackets 240 to the vapor plate assembly 200. As FIG. 6 illustrates, each retaining bracket 240 includes a retaining base portion 240a and the retaining lip portion 240b. The retaining base portion 240a is removably coupled to the seating plate 206 via threaded fasteners 241. The retaining lip portion 240b extends out proximate an upper end of the retaining base portion 240a towards the central passage 207 of the seating plate 206 and over a portion of the engaging portion 304 of the ball joint assembly. The retaining lip portions 240b are designed to engage the first surface 304a (or upper surface 304a) of the engaging portion 304 to prevent the product delivery system 100 from coming apart during a lifting of the product delivery system. The retaining brackets 240, in one embodiment, are also designed to retain the ball joint assembly 300 proximate the vapor plate assembly 202 to keep the spherical segment shaped joining surface 304b of the ball joint assembly 300 aligned with the spherical segment shaped seating face 210 of the vapor plate assembly 200. Hence, the retaining brackets 240 prevent the center of rotation 850 of the ball joint assembly 300 from deviating too far from the ideal orientation in relation to the vapor plate assembly 200 therein keeping the spherical segment shaped joining surface 304b mated with the spherical segment shaped seating face 210 to maintain the seal by the O-ring 700. Moreover, as discussed above, the retaining brackets 240 coupled to the vapor plate assembly 200 operationally couples the ball joint assembly 300 to the vapor plate assembly 200 so the boom assembly 500 can move the self-aligning product delivery system 100 to a desired location. During a product fill process, the boom assembly 500 provides a downward force on the ball joint assembly 300 to maintain the seal between the ball joint assembly 300 and the vapor plate assembly 200. During this product fill process there typically would not be any contact between the lips 240b of the retaining brackets 240 and the first surface 304a (or upper surface 304a) of the engaging portion 304 because of the downward force provided by the boom assembly 500. As discussed briefly above, the retaining brackets 240 are removable. This allows for the easy disconnection of the ball joint assembly 300 from the vapor plate assembly 200 for repair and the replacement of parts such as for the replacement of the O-ring 700.

Also illustrated in FIG. 6 is gasket 250 that is used to create a seal between the vapor plate assembly 200 and the rail tank car 650. In particular, as discussed above, the vapor plate assembly 200 includes a sealing flange 204 that has an upper surface 204a and a lower surface 204b. The gasket 250 is positioned to abut the lower surface 204b of the sealing flange 204. In one embodiment, the gasket 250 is adhesively coupled to the lower surface 204b. The gasket 250 is designed to engage the upper shell 651 of a rail tank car 650. In the embodiment shown in FIG. 6, the upper shell 651 of the rail tank car 650 includes a raised portion 660 with an upper surface 662 that defines the opening 652 to a holding tank 654 of the rail tank car 650. The gasket 250 of the vapor plate assembly 200 engages the upper surface 662 of the rail tank car 650 to create the seal between the vapor plate assembly 200 and the rail tank car 650. In the embodiment illustrated in FIG. 6, the width of the gasket 250 is greater than the width of the upper surface 662 of the raised portion 660 so that the vapor plate assembly 200 does not have to be perfectly aligned with the opening 652 of the holding tank 654 of the rail tank car 650 to achieve a proper seal. Hence, this configuration further provides leeway in aligning the product delivery system 100 with the opening 652 to the holding tank 654 of the rail tank car 650 with the boom system 500.

Also illustrated in the cross-sectional view of FIG. 6 are braces 211 coupled between the vapor plate base portion 202 and the seating plate 206 of the vapor plate assembly 200. The braces 211 provide support to the seating plate 206 of the vapor plate assembly 200. As briefly discussed above, the seating plate 206 also includes a high level sensor aperture 214 through which a high level sensor 800 is accessed. The high level sensor 800, illustrated in this embodiment, includes a pickup sensing end 802 that is configured to receive fluid when the holding tank 654 of the rail tank car 650 gets filled to its capacity. Also illustrated in FIG. 6 is a probe connector 820 that couples the high level sensor 800 to the signal communication link 830 (shown in FIGS. 1 and 2). In operation in one embodiment, when liquid fills up the holding tank 654 of the rail tank car 650 to its near capacity, the high level sensor 800 sends a signal to a shut off controller (not shown) via the signal communication link 830 that automatically shuts off the flow of product to the holding tank 654 of the rail tank car 650.

In a filling operation, the operator would position the rail tank car 650 near the boom assembly 500 and remove the top fill cover 610 to the opening 652 of the holding tank 654 of the rail tank car 650. The boom assembly 500 will then be moved to position the self-aligning product delivery system 100 over the opening 652 to the holding tank 654. The boom assembly 500 then lowers the self-aligning product delivery system 100 to the rail tank car 650 such that the gasket 250 of the vapor plate assembly 100 engages the upper surface 662 of the raised portion 660 that defines the opening 652 of the upper shell 651 of the rail tank car 650 and the engaging portion 304 of the ball joint assembly 300 rests on the seating face 210 of the vapor plate assembly 200. Since, the engaging portion 304 of the ball joint assembly 300 can rotate in relation to the seating plate 206 of the vapor plate assembly 200 while maintaining a seal, the ball joint assembly 300 self aligns in relation to the vapor plate assembly 200. Hence, the boom assembly 500 does not have to position the self-aligning product delivery system 100 in an exact orientation in relation to the opening 652 to the holding tank 654 of the rail tank car 650 to get a proper seal arrangement. Product can then be pumped into the holding tank 654 of the rail tank car 650 through a central ball joint passage 302*e* (shown in FIG. 6) of the ball joint base portion 302. As the product fills up the holding tank 654, vapors already in the holding tank and vapors that are created in the holding tank 654 by the fill process are exhausted through passage 202*c* (shown in FIG. 6) in the vapor plate base portion 202 of the vapor plate assembly 200 to the vapor escape portion 208. The vapors are then passed through a vapor conduit 400 (shown in FIGS. 1 and 2). The vapors are then collected and processed. For example the processing may include burning, condensing back to a liquid or the like. Because of the seals (the O-ring 700 and the gasket 250), the unintentional discharge of the vapors into the atmosphere is prevented. When the holding tank 654 of the rail tank car 650 becomes full, the high level sensor 800 senses the condition and sends a signal to the shut off controller which discontinues the pumping of the product. Once the holding tank 654 is full and product has ceased to be pumped, the boom lifts and removes the self-aligning product delivery system 100 from the opening 652 to the holding tank 654 and the top fill cover 610 of the holding tank upper shell 651 is shut and locked. The process can then continue with the filling of another rail tank car 650.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A self-aligning product delivery system, the system comprising:
 a vapor plate assembly including a vapor plate base portion and a seating plate portion, the vapor plate base portion having a vapor plate passage, the seating plate portion having an opening to the vapor plate passage, the seating plate portion further having a generally spherical segment shaped seating face defining the opening to the central vapor plate passage; and
 a ball joint assembly including a ball joint base portion with a ball joint passage and an engaging portion, the engaging portion extending outward from a surface of the ball joint base portion, the engaging portion including a generally spherical segment shaped joining surface, the spherical segment shaped joining surface of the engaging portion of the ball joint assembly configured and arranged to rotationally mate with the spherical segment shaped seating face defining the opening of the vapor plate assembly to create a seal between the vapor plate assembly and the ball joint assembly while the central ball joint passage of the ball joint assembly is aligned with the vapor plate passage of the vapor plate assembly.

2. The self-aligning product delivery system of claim 1, the system comprising:
 the vapor plate base portion further including an upper end and an opposed lower end;
 the seating plate portion extending inward from the vapor plate base portion proximate the upper end of the vapor plate base portion;
 a sealing flange extending from the vapor plate base portion proximate the lower end of the vapor plate base portion; and
 a gasket configured and arranged to engage a bottom surface of the sealing flange of the vapor plate assembly.

3. The system of claim 1, further comprising:
 the spherical segment shaped seating face of the vapor plate assembly having a groove; and
 an O-ring received in the groove of the spherical segment shaped seating face to provide a seal between the spherical segment shaped seating face of the vapor plate assembly and the spherical segment shaped joining surface of the engaging portion of the ball joint assembly.

4. The system of claim 1, wherein the engaging portion further comprises:
 a first surface extending generally perpendicular from the surface of the ball joint base portion; and
 the spherical segment shaped joining surface extending from the surface of the ball joint base portion a select distance from the first surface, the spherical segment shaped joining surface terminating at an intersection of the spherical segment shaped joining surface and the first surface.

5. The system of claim 1, further comprising:
 the ball joint base portion further includes an upper end, a lower end and a mid portion positioned between the upper end and the lower end, the engaging portion of the ball joint assembly positioned proximate the mid portion of the ball joint base portion;
 an upper connection flange extending outward from the surface of the ball joint base portion proximate the upper end of the ball joint base portion, the upper connection flange configured and arranged to couple the ball joint assembly to a product distribution assembly; and
 a lower connection flange extending outward from a surface of the ball joint base portion proximate the lower end of the ball joint base portion, the lower connection flange configured and arranged to couple the ball joint assembly to a discharge tube.

6. The system of claim 1, further comprising:
a vapor escape portion coupled to the vapor plate base portion of the vapor plate assembly providing a vapor escape passage through the vapor plate base portion.

7. The system of claim 6, further comprising:
a vapor conduit selectively coupled to the vapor escape portion of the vapor plate assembly.

8. The system of claim 1, further comprising:
the seating plate portion of the vapor plate assembly having a high level sensor aperture configured and arranged to receive a high level sensor assembly.

9. The system of claim 8, further comprising:
a high level sensor assembly received in the high level sensor aperture;
a signal communication link configured to deliver a full signal to activate a shut off controller; and
a sensor connector configured and arranged to couple the high level sensor assembly to the signal communication link.

10. The system of claim 1, further comprising:
at least one removable retaining bracket coupled to the vapor plate assembly, the at least one retaining bracket configured and arranged to at least retain a connection between the vapor plate assembly and the ball joint assembly.

11. The system of claim 10, wherein the at least one retaining bracket further comprises:
a retaining base portion removably coupled to the seating plate of the vapor plate assembly; and
a retaining lip portion extending out from the retaining base portion to extend over a portion of the engaging portion of the ball joint assembly.

12. A self-aligning product delivery system, the system comprising:
a vapor plate assembly including a vapor plate base portion with a vapor plate passage, the vapor plate base portion having an upper end and an opposed lower end, a sealing flange extending outward from the vapor plate base portion proximate the lower end of the vapor plate base portion and a seating plate portion extending inward from the vapor plate portion proximate the upper end of the vapor plate base portion, the seating plate having an opening to the vapor plate passage, the seating plate further having a generally spherical segment shaped seating face positioned around the opening, the spherical segment shaped seating face of the vapor plate assembly having a groove;
a ball joint assembly including a ball joint base portion with a ball joint passage and an engaging portion, the engaging portion extending outward from a surface of the ball joint base portion, the engaging portion including a generally spherical segment shaped joining surface, the spherical segment shaped joining surface of the engaging portion of the ball joint assembly configured and arranged to rotationally mate with the spherical segment shaped seating face defining the central opening of the vapor plate assembly to create a seal between the vapor plate assembly and the ball joint assembly while the ball joint passage of the ball joint assembly is aligned with the vapor plate passage of the vapor plate assembly; and
an O-ring received in the groove of the spherical segment shaped seating face to provide a seal between the spherical segment shaped seating face of the vapor plate assembly and the spherical segment shaped joining surface of the engaging portion of the ball joint assembly.

13. The system of claim 12, further comprising:
a vapor escape portion coupled to the vapor plate base portion of the vapor plate assembly providing a vapor escape passage through the vapor plate base portion.

14. The system of claim 12, further comprising:
a gasket configured and arranged to engage a bottom surface of the sealing flange of the vapor plate assembly.

15. The system of claim 12, further comprising:
at least one removable bracket coupled to the vapor plate assembly, the at least one retaining bracket configured and arranged to retain the spherical segment shaped seating face of the vapor plate assembly near the spherical segment shaped joining surface of the engaging portion of the ball joint assembly.

16. The system of claim 12, the engaging portion further comprising:
a first surface extending generally perpendicular from the surface of the ball joint base portion; and
the spherical segment shaped joining surface extending from the surface of the ball joint base portion a select distance from the first surface, the spherical segment shaped joining surface terminating at an intersection of the spherical segment shaped joining surface and the first surface.

17. A self-aligning product delivery system, the system comprising:
a vapor plate assembly including a vapor plate base portion with a vapor plate passage, the vapor plate base portion having an upper end and an opposed lower end, a sealing flange extending outward from the vapor plate base portion proximate the lower end of the vapor plate base portion and a seating plate portion extending inward from the vapor plate portion proximate the upper end of the vapor plate base portion, the seating plate having a central opening to the vapor plate passage, the seating plate further having a generally spherical segment shaped seating face positioned around the central opening;
a ball joint assembly including a ball joint base portion with a ball joint passage and an engaging portion, the engaging portion extending outward from a surface of the ball joint base portion, the engaging portion including a generally spherical segment shaped joining surface, the spherical segment shaped joining surface of the engaging portion of the ball joint assembly configured and arranged to rotationally mate with the spherical segment shaped seating face defining the central opening of the vapor plate assembly to create a seal between the vapor plate assembly and the ball joint assembly when the ball joint passage of the ball joint assembly is aligned with the vapor plate passage of the vapor plate assembly;
at least one removable retaining bracket coupled to the vapor plate assembly, the at least one removable retaining bracket configured and arranged to retain an alignment of the spherical segment shaped seating face of the vapor plate assembly with the spherical segment shaped joining surface of the engaging portion of the ball joint assembly; and
a vapor escape portion coupled to the vapor plate base portion of the vapor plate assembly providing a vapor escape passage through the vapor plate base portion.

18. The system of claim 17, further comprising:
a gasket configured and arranged to engage a bottom surface of the sealing flange of the vapor plate assembly; and
an O-ring received in a groove in the spherical segment shaped seating face of the vapor plate assembly to provide a seal between the spherical segment shaped seating face of the vapor plate assembly and the spherical segment shaped joining surface of the engaging portion of the ball joint assembly.

19. The system of claim 17, wherein the engaging portion further comprises:
  a first surface extending generally perpendicular from the surface of the ball joint base portion; and
  the spherical segment shaped joining surface extending from the surface of the ball joint base portion a select distance from the first surface, the spherical segment shaped joining surface terminating at an intersection of the spherical segment shaped joining surface and the first surface.

20. The system of claim 19, wherein the at least one retaining bracket further comprises:
  a retaining base portion removably coupled to the seating plate of the vapor plate assembly, wherein the at least one retaining bracket can be selectively removed to disassemble and service the system; and
  a retaining lip portion extending out from the retaining base portion to extend over a portion of first surface of the engaging portion of the ball joint assembly.

* * * * *